(12) United States Patent
Zhang et al.

(10) Patent No.: US 9,513,532 B2
(45) Date of Patent: Dec. 6, 2016

(54) OPTICAL PARAMETRIC OSCILLATOR AND SECOND HARMONIC GENERATOR USING MONOCLINIC PHASE $GA_2S_3$ CRYSTAL

(71) Applicant: Fujian Institute of Research on the Structure of Matter, Chinese Academy of Sciences, Fuzhou (CN)

(72) Inventors: Mingjian Zhang, Fuzhou (CN); Guocong Guo, Fuzhou (CN); Huiyi Zeng, Fuzhou (CN); Xiaoming Jiang, Fuzhou (CN); Yuhang Fan, Fuzhou (CN); Binwen Liu, Fuzhou (CN)

(*) Notice: Subject to any disclaimer, the term of this patent is extended or adjusted under 35 U.S.C. 154(b) by 0 days.

(21) Appl. No.: 14/565,133

(22) Filed: Dec. 9, 2014

(65) Prior Publication Data

US 2015/0146281 A1    May 28, 2015

Related U.S. Application Data

(63) Continuation of application No. PCT/CN2012/086248, filed on Dec. 10, 2012.

(30) Foreign Application Priority Data

Jun. 11, 2012 (CN) .......................... 2012 1 0190280
Jun. 11, 2012 (CN) .......................... 2012 1 0191288

(51) Int. Cl.
*G02F 1/355*  (2006.01)
*G02F 1/37*   (2006.01)
*G02F 1/39*   (2006.01)

(52) U.S. Cl.
CPC ............... *G02F 1/3551* (2013.01); *G02F 1/37* (2013.01); *G02F 1/39* (2013.01)

(58) Field of Classification Search
CPC .......... G02F 1/355; G02F 1/3551; G02F 1/37; G02F 1/39
See application file for complete search history.

(56) References Cited

U.S. PATENT DOCUMENTS 5,611,856 A * 3/1997 Schunemann .......... C30B 11/00
                                                       117/37
6,304,583 B1 * 10/2001 Ohmer .................... H01S 3/109
                                                       372/105

FOREIGN PATENT DOCUMENTS

| CN | 1952222 A | 4/2007 |
| CN | 101376492 A | 3/2009 |
| CN | 101544472 A | 9/2009 |

(Continued)

OTHER PUBLICATIONS

English translation of Written Opinion of the International Searching Authority for PCT/CN2012/086248, Mar. 21, 2013.

(Continued)

*Primary Examiner* — Daniel Petkovsek

(57) ABSTRACT

This disclosure provides a second harmonic generator and an optical parametric oscillator, the second harmonic generator and the optical parametric oscillator comprise one or more nonlinear optical frequency conversion crystal and a pump laser source, the nonlinear optical frequency conversion crystal is a monoclinic $Ga_2S_3$ crystal, the space group of the monoclinic $Ga_2S_3$ crystal is Cc, and the unit cell parameters are a=11.1.ANG., b=6.4.ANG., c=7.0.ANG., .alpha.=90.degree., .beta.=121.degree., .gamma.=90.degree., and Z=4.

14 Claims, 2 Drawing Sheets

(56) References Cited

FOREIGN PATENT DOCUMENTS

| CN | 102351425 A | 2/2012 |
|----|-------------|--------|
| CN | 102681289 A | 9/2012 |
| CN | 102701269 A | 10/2012 |
| WO | WO 94/29217 A1 | 12/1994 |

OTHER PUBLICATIONS

English translation of International Search Report of the International Searching Authority for PCT/CN2012/086248, Mar. 21, 2013.
Jun. 11, 2015 Office Action for Chinese patent application No. CN201210526093.2 without English translation.
Dec. 3, 2015 Office Action for Chinese patent application No. CN201210526093.2 without English translation.
Jun. 3, 2016 Office Action for Chinese patent application No. CN201210526093.2 without English translation.

\* cited by examiner

OPTICAL PARAMETRIC OSCILLATOR AND SECOND HARMONIC GENERATOR USING MONOCLINIC PHASE GA₂S₃ CRYSTAL

CROSS REFERENCE TO RELATED APPLICATIONS

This application is a Continuation Application of International Application No. PCT/CN2012/086248, filed Dec. 10, 2012, which claims priority to Chinese Patent Application No. 201210190280.8, filed Jun. 11, 2012, and Chinese Patent Application No. 201210190288.6, filed Jun. 11, 2012, the entire disclosures of which are incorporated herein by reference in their entireties.

TECHNICAL FIELD

This disclosure relates to an optical parametric oscillator and a second harmonic generator using a monoclinic phase $Ga_2S_3$ crystal as infrared band second order nonlinear optical materials.

BACKGROUND

Optical parametric oscillators and second harmonic generators are commonly used nonlinear optical devices, and the second order nonlinear optical material is the key material for achieving the function thereof. For a second order nonlinear optical material in the infrared region, this disclosure uses a monoclinic phase $Ga_2S_3$ crystal which has never been used in the art, obtaining an optical parametric oscillator and a second harmonic generator having high laser damage threshold.

Because of the application of laser technology, the nonlinear optical crystal materials have drawn increasing attention of the public. In particular, the second order nonlinear optical crystal materials of deep ultraviolet and middle/far infrared regions, which are far from satisfying the requirements of the applications due to the lack of varieties, have become the hot spot of research. The chalcogenide system has become a direction of the research of middle/far infrared second order nonlinear optical crystal, wherein, for example, $AgGaS_2$ (AGS), $AgGaSe_2$ (AGSe), $AgGa_{(1-x)}In_xSe_2$, GaSe, $LiInS_2$ (LIS), $LiInSe_2$, and the like have drawn wide attention. These chalcogenides are mainly ternary compounds or more. Less attention is paid to the research of the second order nonlinear optical properties of binary chalcogenide compounds. However, comparing with the ternary compounds or more, the binary chalcogenides generally have the advantages of simple structure, convenient synthesis, stable physical and chemical features, and so on.

$Ga_2S_3$ has three crystal phases: monoclinic phase (Cc), hexagonal phase (P6₃mc) and cubic phase (F-43m), which are all noncentrosymmetric space groups, meaning that $Ga_2S_3$ may have second order nonlinear optical effects. In 1961, Goodyear et al. reported the monoclinic phase structure (Cc) of $Ga_2S_3$ in Acta Crystal for the first time. There is no report regarding using $Ga_2S_3$ as the infrared second order nonlinear optical materials hitherto.

There are two known synthetic methods for $Ga_2S_3$, both of which employ Ga and S elementary materials as the starting reactants. The first method comprises mixing Ga and S in a proper ratio, enclosing into a evacuated quartz tube, keeping at 450° C. for 5 days, and then heating at a rate of 50° C./12 h to a temperature of 1100° C., and naturally cooling down to obtain polycrystalline powders of $Ga_2S_3$. The second method comprises placing equal amount of Ga and S into two quartz boats in a flame-sealed quartz tube under a vacuum condition, heating the quartz boat containing Ga to 1150° C., and heating the quartz boat containing S to 450-500° C. After one day, polycrystalline powders of $Ga_2S_3$ are formed on one end of the quartz boat containing Ga. The $Ga_2S_3$ obtained in both methods are of a monoclinic phase. Embodiments of the disclosure use $Ga_2O_3$, S powder, and B powder as the starting materials, and synthesize monoclinic phase $Ga_2S_3$ employing a high temperature solid-state boron-sulfur method.

SUMMARY

In some embodiments of the disclosure, it is provided a second harmonic generator, comprising one or more nonlinear optical frequency conversioncrystal and a pump laser source, wherein the nonlinear optical frequency conversioncrystal is a monoclinic $Ga_2S_3$ crystal, the space group of the monoclinic $Ga_2S_3$ crystal is Cc, and the unit cell parameters are a=11.1 Å, b=6.4 Å, c=7.0 Å, α=90°, β=121°, γ=90°, and Z=4.

In some embodiments of the disclosure, it is provided an optical parametric oscillator, comprising, in the light path, a first lens, a laser crystal, a second lens, a nonlinear optical crystal, and third lens in this order, wherein an optical parametric oscillation chamber is formed between the second lens and the third lens, and the nonlinear optical crystal is a monoclinic $Ga_2S_3$ crystal, the space group of the monoclinic $Ga_2S_3$ crystal being Cc, and the unit cell parameters being a=11.1 Å, b=6.4 Å, c=7.0 Å, α=90°, β=121°, γ=90°, and Z=4.

SPECIFIC EMBODIMENTS

Figure 1:
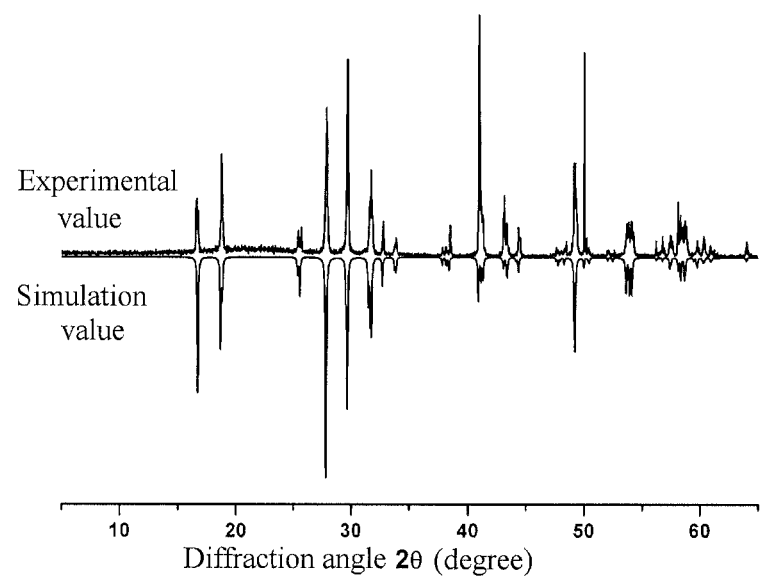
FIG. 1 is the powder X-ray diffraction pattern of a compound of one embodiment of this disclosure.

In some embodiments disclosed in the disclosure, the pump laser source includes a liquid laser, a solid laser, a gas laser or a semiconductor laser.

In some embodiments disclosed in the disclosure, the wavelength of the laser emitted by the pump laser source is in a range of from 1 to 20 micrometers.

In some embodiments disclosed in the disclosure, the pump laser source includes a continuous wave laser, or a pulse laser.

In some embodiments disclosed in the disclosure, manners for achieving phase matching in the nonlinear optical crystal by the pump laser source comprise collinear, non-collinear, critical and non-critical phase matching.

In some embodiments disclosed in the disclosure, the area of the monoclinic $Ga_2S_3$ crystal is from 0.5 to 5 cm².

In some embodiments disclosed in the disclosure, the area of the monoclinic $Ga_2S_3$ crystal is from 1.0 to 5 cm².

In some embodiments disclosed in the disclosure, the area of the monoclinic $Ga_2S_3$ crystal is from 1.5 to 5 cm².

In some embodiments disclosed in the disclosure, the area of the monoclinic $Ga_2S_3$ crystal is from 2.0 to 5 cm².

In some embodiments disclosed in the disclosure, the area of the monoclinic $Ga_2S_3$ crystal is from 2.5 to 5 $cm^2$.

In some embodiments disclosed in the disclosure, the area of the monoclinic $Ga_2S_3$ crystal is from 3.0 to 5 $cm^2$.

In some embodiments disclosed in the disclosure, the area of the monoclinic $Ga_2S_3$ crystal is from 3.5 to 5 $cm^2$.

In some embodiments disclosed in the disclosure, the area of the monoclinic $Ga_2S_3$ crystal is from 5 to 10 $cm^2$.

In some embodiments disclosed in the disclosure, the output power of the second harmonic generator is 0.5 W or more.

In some embodiments disclosed in the disclosure, the output power of the optical parametric oscillator is 0.5 W or more.

In some embodiments disclosed in the disclosure, it is provided a monoclinic $Ga_2S_3$ crystal material, and the preparation method thereof. The preparation method is simple and easy to be handled. The material sources are abundant. The yield of the compound is high. The purity is high and the reproductively is good. The preparation method is therefore suitable for mass production.

In some embodiments disclosed in the disclosure, not only the synthesis temperature (950° C.) is reduced, but also the complicated procedure of the traditional operation are avoided, and moreover, the cost is reduced because $Ga_2O_3$ with much lower price is used for replacing Ga.

In some specific embodiments disclosed in the disclosure, the disclosure comprises the following technical solutions:

A preparation method of a binary metal sulfide crystal material, wherein the metal sulfide is one of a chemical formula of $Ga_2S_3$, a monoclinic crystal system, and a Cc space group, and the unit cell parameters are a=11.1 Å, b=6.4 Å, c=7.0 Å, α=90°, β=121°, γ=90°, Z=4, wherein $Ga_2O_3$, B, and S are mixed and grinded at a proper ratio, loaded into a evacuated and flame-sealed quartz tube, and then treated at a certain temperature to obtain the monoclinic $Ga_2S_3$ product.

In some specific embodiments disclosed in the disclosure, the metal sulfide has a three dimensional network frame structure.

In some specific embodiments disclosed in the disclosure, the method is a high temperature solid-state boron-sulfur process for producing monoclinic phase $Ga_2S_3$.

In some specific embodiments disclosed in the disclosure, the molar ratio of the $Ga_2O_3$, B, and S is 1:2:3.

In some specific embodiments disclosed in the disclosure, the molar ratio of the $Ga_2O_3$, B, and S is 1:2:3, wherein the amount of S is additionally 1-3% in excess, preferably 1-2% in excess, to ensure the sufficient reaction.

In some specific embodiments disclosed in the disclosure, the treatment temperature is increased at a rate of 30 to 40° C./h to 850-980° C. (preferably 880-950° C., more preferably 900-950° C.), keeping such temperature for 48-144 hours (preferably 60-120 h, more preferably 60-100 h), and then decreased at a rate of 2 to 6° C./h (preferably 2-5° C./h, more preferably 2-4° C./h) to 250° C.

In some specific embodiments disclosed in the disclosure, the preparation method comprises mixing and grinding $Ga_2O_3$, B, and S at a molar ratio of 1:2:3 (preferably, wherein the amount of S is additionally 1-3% in excess), pressing into pellets and loading into a evacuated quartz tube to be heated, increasing the temperature at a rate of 30 to 40° C./h to 850-980° C. (preferably 880-950° C., more preferably 900-950° C.), keeping the temperature for 48-144 hours (preferably 60-120 h, more preferably 60-100 h), and then decreasing the temperature at a rate of 2 to 6° C./h (preferably 2-5° C./h, more preferably 2-4° C./h) to 250° C., turning off the power source, taking out the quartz tube, and washing away the byproduct $B_2O_3$ with hot water, to obtain monoclinic phase $Ga_2S_3$ as pale yellow microcrystal.

In some specific embodiments disclosed in the disclosure, the yield of the production method of the disclosure is 90% or more, preferably 95% or more, or 98% or more.

The specific reaction formula of the disclosure is:

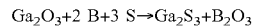
$$Ga_2O_3 + 2\ B + 3\ S \rightarrow Ga_2S_3 + B_2O_3$$

In some specific embodiments disclosed in the disclosure, the disclosure also provides the use of the above binary metal chalcogenide monoclinic $Ga_2S_3$ having a three dimensional network frame structure as a nonlinear optical crystal.

In some specific embodiments disclosed in the disclosure, the use as second order nonlinear optical materials in the middle/far infrared regions is preferable. More preferably, the monoclinic $Ga_2S_3$ (preferably after it grows into big crystal) is used in the laser applications such as a second harmonic generator or an optical parametric oscillator, for extending the band range of the laser.

Some specific embodiments disclosed in the disclosure relate to the use of the monoclinic $Ga_2S_3$ as the second order nonlinear optical materials in the infrared region, wherein the material has a phase matching behavior at 1910 nm, and a powder second harmonic generation (SHG) signal which is 0.7 times of the commercial nonlinear optical crystal $KTiOPO_4$ (KTP).

Some specific embodiments disclosed in the disclosure relate to the use of the monoclinic phase $Ga_2S_3$ as second order nonlinear optical materials in the infrared region, wherein, under a 1064 nm laser having a pulse width of 8 ns, the material has a powder laser damage threshold of 174 $MW/cm^2$. This value is larger than the traditional infrared nonlinear optical crystal AGS (0.03 $GW/cm^2$@1064 nm with $\tau_p$ as 10 ns) and LIS (0.1 $GW/cm^2$@1064 nm with $\tau_p$ as 10 ns).

The features of the preparation method of some specific embodiments of the disclosure comprise, but not limit to: (1) the source materials are $Ga_2O_3$, S, and B, instead of traditional Ga, S; (2) the ratio between materials is a special ratio of 1:2:3, with S may be 1-3% slightly in excess, for ensuring sufficient reaction between the source materials; (3) because heating too fast may burst up the quartz tube, and cooling too fast may result in poor quality of crystal and the structural disorder, the constant temperature and the duration of the constant temperature employed in the disclosure determine the crystallization degree and the crystal size, such that embodiments of the disclosure may produce good nonlinear optical crystal materials.

The disclosure is further described by the following examples. However, the following examples do not limit the disclosure. Any replacement and variation made to the disclosure are within the scope of the disclosure.

The synthesis of the compound $Ga_2S_3$ in some embodiments of the disclosure comprises:

obtaining $Ga_2S_3$ by a high temperature solid state synthesis method, with the specific reaction formula being:

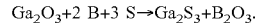
$$Ga_2O_3 + 2\ B + 3\ S \rightarrow Ga_2S_3 + B_2O_3.$$

The specific operation procedures are:

mixing $Ga_2O_3$, B, and S according a molar ratio of 1:2:3, pressing into pellets and loading into a evacuated and flame-sealed quartz tube, and then heating up at a rate of 30~40° C./h to 850-980° C., keeping the temperature for 48-144 hours, and then cooling down at a rate of 2-6° C./h to 250° C., finally, turning off the power supply, bringing out the quartz tube, washing away the byproduct $B_2O_3$ with hot water, to obtain pale yellow block compound microcrystal, with a yield of 90% or more. The single crystal X-ray diffraction measurement and elemental analysis test show that this crystal is a monoclinic phase $Ga_2S_3$.

Example 1

The Synthesis of 1 mmol Monoclinic Phase $Ga_2S_3$ 1 mmol of $Ga_2O_3$ (187 mg), 2 mmol of B powder (22 mg), and 3 mmol of S powder (97 mg, 1% in excess) were weighted, placed into an agate mortar and grinded for about 10 min to be uniformly mixed, and then the mixture was pressed into a pellet, which was sealed into a quartz tube having a length of about 10 cm, an outer diameter of 13 mm and an inner diameter of 11 mm with oxy-hydrogen flame under a degree of vacuum less than 10 Pa. The quartz tube was placed into a muffle furnace, and heated up at a rate of 30° C./h to 920° C. The temperature was kept for 60 hours, and then decreased at a rate of 5° C./h to 250° C. The power supply was turned off and the temperature was naturally reduced to room temperature. The quartz tube was taken out. After the tube was opened, it was washed with hot water to remove byproduct $B_2O_3$, obtaining about 1 mmol of monoclinic phase $Ga_2S_3$ polycrystalline powder, with a yield of 90% or more.

The crystal structure parameters in some embodiments of this disclosure are: a=11.117(9) Å, b=6.406(5) Å, c=7.033(5) Å, $\alpha$=90°, $\beta$=121.15(9)°, $\gamma$=90°, Z=4. The crystal structure analysis shows that, this compound has a simple three dimensional network frame structure, crystallized at a non-centrosymmtric space group Cc.

Example 2

The Synthesis of 30 mmol Monoclinic Phase $Ga_2S_3$ 30 mmol of $Ga_2O_3$ (5623 mg), 60 mmol of B powder (649 mg), 90 mmol of S powder (2943 mg, 2% in excess) were weighted, placed in a ball mill and milled at 400 r/min for 2 h to be uniformly mixed, and then the mixture was pressed into a pellet, which was sealed into a quartz tube having a length of about 15 cm, an outer diameter of 23 mm and an inner diameter of 20 mm with oxy-hydrogen flame under a degree of vacuum less than 10 Pa. The quartz tube was placed into a muffle furnace, and heated up at a rate of 30° C./h to 900° C. The temperature was kept for 60 hours, and then decreased at a rate of 5° C./h to 250° C. The power supply was turned off and the temperature was naturally reduced to room temperature. The quartz tube was taken out. After the tube was opened, it was washed with hot water to remove byproduct $B_2O_3$, obtaining about 30 mmol of monoclinic $Ga_2S_3$ polycrystalline powder, with a yield of 90% or more.

This example shows that the method may be used for massive synthesis monoclinic $Ga_2S_3$ polycrystalline powder, which is the basis of the growth of monoclinic $Ga_2S_3$ big crystal in the next step.

Example 3

The Synthesis of Monoclinic $Ga_2S_3$ Crystal

Monoclinic $Ga_2S_3$ crystal was grown using the Bridgman-Stockbarger method. The growth device of crystal was a modified two-zone Bridgman furnace. The controlling device was an 808P programmable automatic temperature controller. The source material used was 3 g of $Ga_2S_3$ polycrystalline material synthesized in Example 2.

Specific steps were as following. 3 g of $Ga_2S_3$ polycrystalline material prepared in Example 2 was weighted. After uniformly grinding, the material was loaded into a quartz tube crucible having an inner diameter of 15 mm and an outer diameter of 18 mm. After evacuated for 2-6 hours, the inner pressure of the quartz tube crucible is about 0.1 Pa, at this time, the tube was sealed with oxy-hydrogen flame, and the sealed quartz tube was loaded into a quartz tube having an inner diameter of 20 mm and an outer diameter of 23 mm. evacuated for 0.5-2 h, and when the inner pressure was slightly higher than 0.1 Pa, the tube was sealed with oxy-hydrogen flame. The sealed double layer quartz tube was placed into an upper furnace of a Bridgman furnace. The temperature was slowly increased to 700° C., and kept for 10 hours. The temperature was then increased to 950° C., and then kept for 10 hours. Finally, the temperature was increased to 1100° C. to melt the materials, and kept for 20-80 hours. At this time, the crucible was cooled to room temperature at a falling rate of 0.5 mm/h. The furnace was shut down. After the sample was cooled, transparent pale yellow $Ga_2S_3$ single crystal was obtained.

Example 4

Performance Test for the Monoclinic Phase $Ga_2S_3$ Powder

Powder X-ray diffraction test employed Rigaku Miniflex II diffractometer. This diffractometer used Cu target X-ray. The operating voltage and current were 30 KV and 15 mA, respectively. The scanning speed was 5 degrees/min. The scanning range was 5-65 degree. The simulated pattern of the powder diffraction is obtained by mercury software based on the single crystal structure of monoclinic $Ga_2S_3$. Infrared transmission spectrum was obtained using Spectrum One Fourier transform infrared spectrograph manufactured by Perkin-Elmer. The testing range was 4000-400 $cm^{-1}$. The sample powder and KBr was sufficiently grinded at a ratio of 1:100 and pressed for testing. There was no obvious adsorption peak in the range of 4000-400 $cm^{-1}$.

An ultraviolet diffuse reflectance spectrum was measured using Lambda 900 UV-vis-near infrared spectrograph manufactured by Perkin-Elmer. An integrating sphere was employed. The testing range was 190-2500 nm. A $BaSO_4$ plate was used as reference. Sufficiently grinded sample powder was placed thereon. The absorption spectrum is calculated from diffuse reflectance spectrum using Kubelka-Munk formula $\alpha/S=(1-R)^2/2R$ (R is the reflectivity, S is the scattering coefficient, $\alpha$ is the absorption coefficient).

Figure 2:
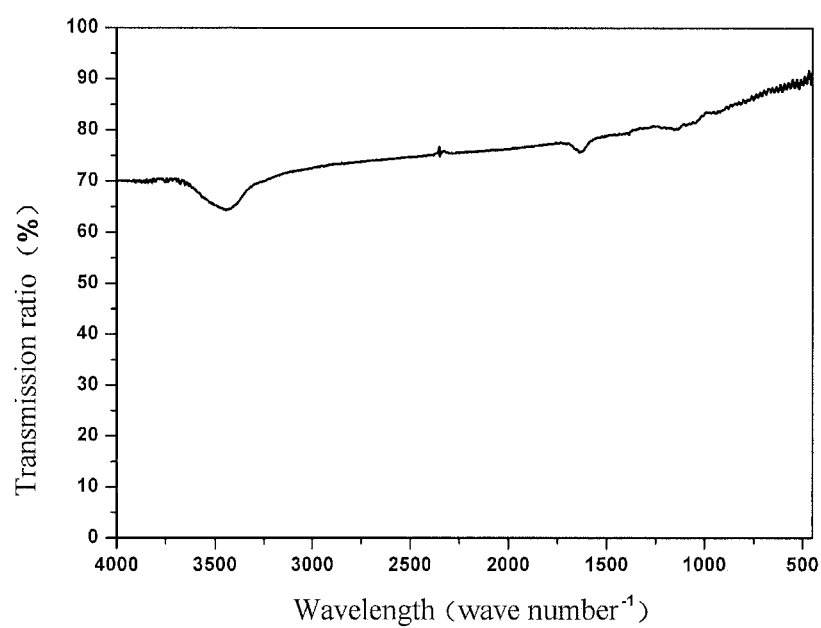
FIG. 2 is the infrared absorption spectrum of a compound of one embodiment of this disclosure.
Figure 3:
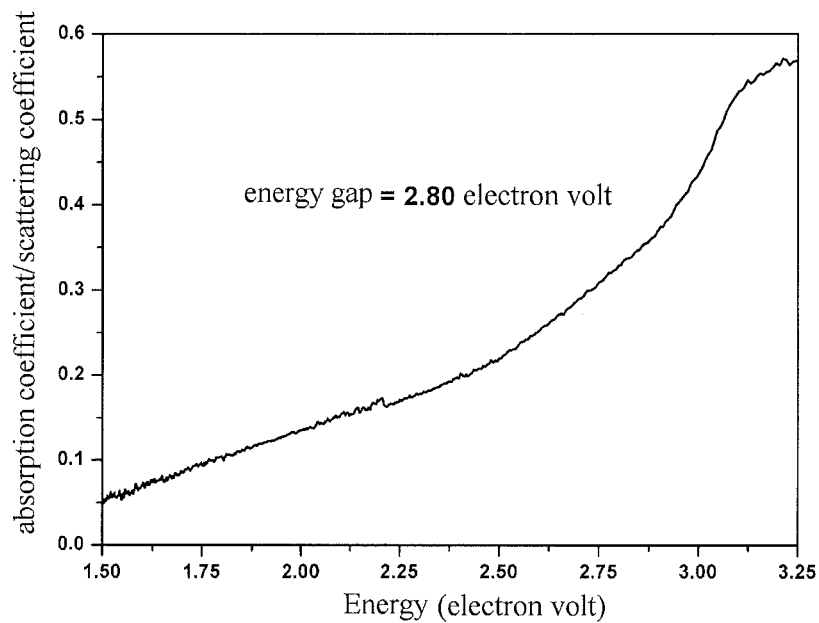
FIG. 3 is the UV-Vis diffuse reflectance spectroscopy of a compound of one embodiment of this disclosure.

As shown by FIGS. 1, 2, and 3, there was no impure peak in powder diffraction pattern, indicating a high purity of the compound prepared by the high temperature solid-state boron-sulfur method. Infrared transmission spectrum showed that the compound was infrared transparent in the range of 2.5-25 μm. UV-vis diffuse reflectance spectrum showed that the energy gap of the compound was about 2.80 eV.

Example 5

SHG Phase Matching Test of the Monoclinic $Ga_2S_3$ Powder

The monoclinic $Ga_2S_3$ polycrystalline powder was sieved with a steel sieve, and divided into six powder samples having particle size ranges of 30-50, 50-75, 75-100, 100-150, 150-200, and 200-300 µm, respectively. The samples were charged and placed on the light path of the laser. The intensities of SHG signals thereof at an infrared laser wavelength of 1910 nm were measured with a near infrared CCD. The phase matching behavior of the compound was judged after a diagram was made. The testing results of the powder SHG phase matching were shown in FIG. 4.

Figure 4:
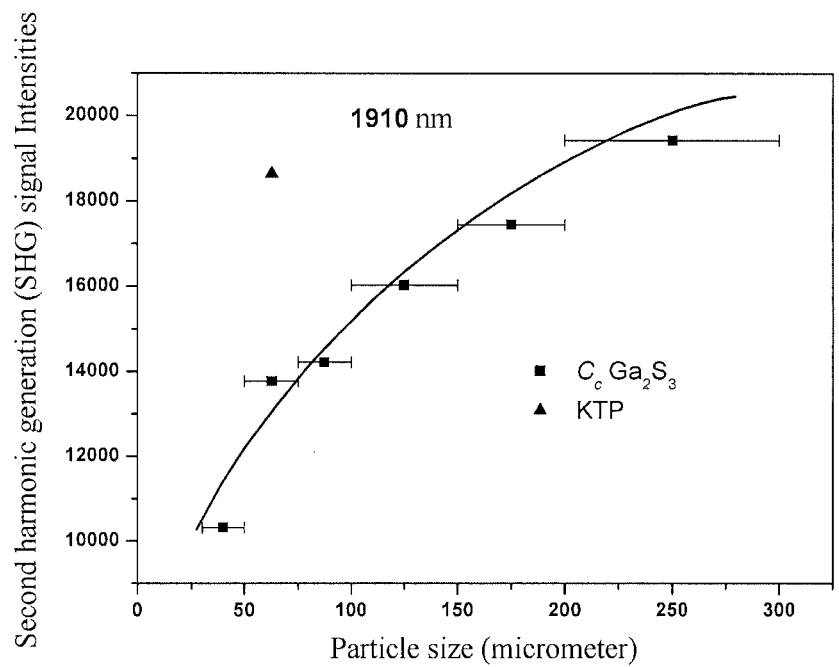
FIG. 4 the phase matching pattern at 1910 nm of a compound of one embodiment of this disclosure.

As shown by FIG. 4, the second order nonlinear optical effect test showed that, this compound had a relatively large second order nonlinear optical effect. The SHG signals of the sample increased as the particle size thereof increased. The intensities of SHG signal were about 0.7 times of that of KTP, and the monoclinic $Ga_2S_3$ phase matched under 1910 nm laser. It may be used as a nonlinear optical crystal material.

Example 6

Laser Damage Threshold Test of Monoclinic Phase $Ga_2S_3$

The monoclinic phase $Ga_2S_3$ polycrystalline powder was sieved as the powder sample having a particle size range of 50-75 µm with a steel sieve. After the sample was charged, the laser damage threshold thereof was measured under a laser at 1064 nm having a pulse width of about 8 ns. The powder of the laser was continuously increased, and the damage situation of the sample was observed, until damage spot occurred on the sample. The laser power at this time was recorded, and the main damage spot area was measured as 2.45 mm$^2$.

The laser damage threshold test of polycrystalline powder sample showed that, the laser damage threshold of this compound was 174 MW/cm$^2$, which was larger than that of classical infrared nonlinear crystal AGS (0.03 GW/cm$^2$@1064 nm with $\tau_p$ as 10 ns) and LIS (0.1 GW/cm$^2$@1064 nm with $\tau_p$ as 10 ns).

Example 7

The crystal obtained in Example 3 was subjected to directionally cutting and polishing treatment, to make an optical parametric device. A Q-switched Nd:YAG laser light source having wavelength of 1.064 µm was used as the pump light source, to produce a laser output of 3-14 micrometers.

Example 8

The crystal obtained in Example 3 was subjected to directionally cutting and polishing treatment, to make an optical parametric device. A Q-switched Nd:YAG laser light source having wavelength of 1.34 µm was used as the pump source, to produce a laser output of 3-14 micrometers.

Example 9

The crystal obtained in Example 3 was subjected to directionally cutting and polishing treatment, to make an optical parametric device. A Q-switched Ho:YAG laser light source having wavelength of 2.06 µm was used as the pump source, to produce a laser output of 3-14 micrometers.

Example 10

The Performance Test of the Second Harmonic Generator

A second harmonic generator was produced using the monoclinic $Ga_2S_3$ crystal produced in Example 3 as the nonlinear optical frequency conversion crystal, and a pump laser source. It was observed via output profile test that, this second harmonic generator may still produce good output profile at high output.

Example 11

The Performance Test of the Optical Parametric Oscillator

An optical parametric oscillator was produced using the monoclinic $Ga_2S_3$ crystal prepared in Example 3 as a nonlinear optical frequency conversion crystal, a first lens, a laser crystal, and a second lens. It was observed via output profile test that, this optical parametric oscillator may still produce good output profile at high output.

The invention claimed is:

1. A second harmonic generator, comprising:
   one or more nonlinear optical frequency conversion crystals and a pump laser source,
   wherein the one or more nonlinear optical frequency conversion crystals are monoclinic $Ga_2S_3$ crystals, the space group of the monoclinic $Ga_2S_3$ crystal is Cc, and the unit cell parameters are a=11.1 Å, b=6.4 Å, c=7.0 Å, $\alpha$=90°, $\beta$=121°, $\gamma$=90°, and Z=4.

2. The second harmonic generator according to claim 1, wherein the wavelength of the laser emitted by the pump laser source is between 1 to 20 micrometers.

3. The second harmonic generator according to claim 1, wherein the pump laser source is a liquid laser, a solid laser, a gas laser or a semiconductor laser.

4. The second harmonic generator according to claim 1, wherein the pump laser source is a continuous wave laser or a pulse laser.

5. The second harmonic generator according to claim 1, wherein manners for achieving phase matching in the nonlinear optical crystal by the pump laser source comprise collinear, non-collinear, critical and non-critical phase matching.

6. The second harmonic generator according to claim 1, wherein the area of the monoclinic $Ga_2S_3$ crystal is from 0.5 to 5 cm$^2$.

7. The second harmonic generator according to claim 1, wherein the area of the monoclinic $Ga_2S_3$ crystal is from 1.0 to 5 cm$^2$.

8. The second harmonic generator according to claim 1, wherein the area of the monoclinic $Ga_2S_3$ crystal is from 1.5 to 5 cm$^2$.

9. The second harmonic generator according to claim 1, wherein the area of the monoclinic $Ga_2S_3$ crystal is from 2.0 to 5 cm$^2$.

10. The second harmonic generator according to claim 1, wherein the area of the monoclinic $Ga_2S_3$ crystal is from 2.5 to 5 cm$^2$.

11. The second harmonic generator according to claim 1, wherein the area of the monoclinic $Ga_2S_3$ crystal is from 3.0 to 5 cm$^2$.

12. The second harmonic generator according to claim 1, wherein the area of the monoclinic $Ga_2S_3$ crystal is from 3.5 to 5 cm$^2$.

13. The second harmonic generator according to claim 1, wherein the area of the monoclinic $Ga_2S_3$ crystal is from 5 to 10 $cm^2$.

14. The second harmonic generator according to claim 1, wherein the output power of the second harmonic generator is 0.5 W or more.

* * * * *